(12) United States Patent
MacInnis (10) Patent No.: US 8,107,011 B2
(45) Date of Patent: Jan. 31, 2012

(54) METHOD AND SYSTEM FOR VIDEO EVALUATION IN THE PRESENCE OF CROSS-CHROMA INTERFERENCE

(75) Inventor: Alexander MacInnis, Lake Oswego, OR (US)

(73) Assignee: Broadcom Corporation, Irvine, CA (US)

( * ) Notice: Subject to any disclaimer, the term of this patent is extended or adjusted under 35 U.S.C. 154(b) by 1380 days.

(21) Appl. No.: 11/486,323

(22) Filed: Jul. 13, 2006

(65) Prior Publication Data

US 2007/0013815 A1 Jan. 18, 2007

Related U.S. Application Data

(60) Provisional application No. 60/701,180, filed on Jul. 18, 2005, provisional application No. 60/701,179, filed on Jul. 18, 2005, provisional application No. 60/701,181, filed on Jul. 18, 2005, provisional application No. 60/701,178, filed on Jul. 18, 2005, provisional application No. 60/701,177, filed on Jul. 18, 2005, provisional application No. 60/701,182, filed on Jul. 18, 2005.

(51) Int. Cl.
*H04N 7/12* (2006.01)

(52) U.S. Cl. .................. 348/609; 375/240.12

(58) Field of Classification Search .................. 348/624, 348/453, 700, 701, 607, 611, 618; 375/240.12, 375/240.16; 382/233, 236
See application file for complete search history.

(56) References Cited

U.S. PATENT DOCUMENTS

| | | | | |
|---|---|---|---|---|
| 5,485,210 A * | 1/1996 | Lim et al. | .................. | 375/240.16 |
| 5,905,812 A * | 5/1999 | Kim | .................. | 382/236 |
| 6,360,014 B1 * | 3/2002 | Boon | .................. | 382/233 |
| 7,061,538 B2 * | 6/2006 | Kondo et al. | .................. | 348/453 |
| 2007/0237224 A1 * | 10/2007 | Krishnan | .................. | 375/240.12 |

* cited by examiner

*Primary Examiner* — Paulos Natnael
(74) *Attorney, Agent, or Firm* — Thomas, Kayden, Horstemeyer & Risley, LLP (57) ABSTRACT

Described herein is a method and system for video sequence evaluation in the presence of cross-chroma interference. When the luma and chroma components in an analog video sequence are separated, the luma component may add interference to the chroma component. This is called cross-chroma interference. In the evaluation of the video sequence, the cross-chroma interference may be interpreted as motion, noise, or other artifacts. By reducing the cross-chroma interference during the evaluation, motion and noise can be identified with greater probability. The proper identification can aid motion estimators used in video coding and motion compensated temporal filtering, and it can aid video filters that do not utilize motion compensation.

56 Claims, 5 Drawing Sheets

METHOD AND SYSTEM FOR VIDEO EVALUATION IN THE PRESENCE OF CROSS-CHROMA INTERFERENCE

RELATED APPLICATIONS

This application claims priority to "METHOD AND SYSTEM FOR VIDEO EVALUATION IN THE PRESENCE OF CROSS-CHROMA INTERFERENCE", Provisional Application for U.S. patent, Ser. No. 60/701,180, filed Jul. 18, 2005, by Alexander MacInnis, which is incorporated by reference herein for all purposes.

This application is related to the following applications, each of which is hereby incorporated herein by reference in its entirety for all purposes:

U.S. Provisional Patent Application Ser. No. 60/701,179, METHOD AND SYSTEM FOR NOISE REDUCTION WITH A MOTION COMPENSATED TEMPORAL FILTER, filed Jul. 18, 2005 by Alexander MacInnis;

U.S. Provisional Patent Application Ser. No. 60/701,181, METHOD AND SYSTEM FOR MOTION COMPENSATION, filed Jul. 18, 2005 by Alexander MacInnis;

U.S. Provisional Patent Application Ser. No. 60/701,178, METHOD AND SYSTEM FOR ADAPTIVE FILM GRAIN NOISE PROCESSING, filed Jul. 18, 2005 by MacInnis;

U.S. Provisional Patent Application Ser. No. 60/701,177, METHOD AND SYSTEM FOR ESTIMATING NOISE IN VIDEO DATA, filed Jul. 18, 2005 by MacInnis; and U.S. Provisional Patent Application Ser. No. 60/701,182, METHOD AND SYSTEM FOR MOTION ESTIMATION, filed Jul. 18, 2005 by MacInnis.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Three major analog television standards are NTSC, PAL, and SECAM. The National Television System Committee developed the NTSC standard in the U.S. in 1953. NTSC is used in United States, Canada, Japan, in most of the American continent countries, and in various Asian countries. NTSC runs on 525 lines/frame with a vertical frequency of 60 Hz and a framerate of 29.97 frames/sec.

The PAL (Phase Alternating Line) standard was introduced in the early 1960's in Europe. It has better resolution than NTSC, with 625 lines/frame. The framerate is slightly lower than that of NTSC, being 25 frames/sec. PAL is used in most western European countries (except France), Australia, some countries of Africa, some countries of South America, and in some Asian countries.

The SECAM (Sequential Color with Memory) standard was introduced in the early 1960's. SECAM uses the same bandwidth as PAL but transmits the color information sequentially. SECAM runs on 625 lines/frame with a framerate of 25 fps. SECAM is used in France, former French colonies, and in former communist countries in Europe.

Color can be created by selectively weighting combinations of a Red component, a Green component, and a Blue component (RGB). Analog video standards translate the RGB components into luminance (Y) and chrominance (C). Chrominance is a two-dimensional component. The PAL and SECAM standard use U and V to denote these two dimensions. The U signal is based on the difference between the Y component and the Blue component. The V signal is based on the difference between the Y component and the Red component.

The NTSC standard uses I and Q to denote the two dimensions of chrominance. The I-Q plane differs from the U-V plane by a 33-degree rotation and axis-swap. This rotation puts the I color axis in the orange region of the color space, which is where flesh tones are found. Since the human eye notices detail in the color region represented by the I component more easily than other those in the Q component, I can then be given a higher bandwidth than Q.

In standards such as NTSC, PAL and SECAM, the Y and C components are combined into one composite video signal. When the Y and C components in a composite analog video sequence are separated, the Y component may add interference to the C component. This is called cross-chroma interference. Similarly the C component may add cross-luma interference to the Y component. In the evaluation of the video sequence, the cross-chroma and cross-luma interference may be interpreted as motion, noise, or other artifacts. Various processing may be applied to the analog video. However, cross-chroma and cross-luma interference may lead to inaccurate noise characterization, especially during scenes with motion.

Limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Described herein are system(s) and method(s) for video sequence evaluation in the presence of cross-chroma and cross-luma interference, substantially as shown in and/or described in connection with at least one of the figures, as set forth more completely in the claims.

These and other advantages and novel features of the present invention will be more fully understood from the following description.

DETAILED DESCRIPTION OF THE INVENTION

An analog video sequence may comprise luminance and chrominance; also known as the luma component (Y) and the chroma component (C). When the luma and chroma components in the analog video sequence are not separated perfectly, the luma component may add interference to the chroma component. This is called cross-chroma interference. Likewise, the chroma component may add interference to the luma component; this is called cross-luma interference. In the evaluation of the video sequence, the cross-chroma and cross-luma interference may be interpreted as motion, noise, or other artifacts. Described herein is a method and system for video sequence evaluation in the presence of cross-chroma and cross-luma interference. By reducing the cross-chroma interference during the evaluation, motion and noise can be identified with greater probability. The proper identification of motion and noise can aid motion estimators used in video coding and motion compensated temporal filtering.

The chroma component (C) in an NTSC signal is complex and comprises an in-phase signal (I) and a quadrature signal (Q). The magnitude of the chroma component is related to the saturation of the color and the phase of the chroma component is related to the hue of the color. The spectrum of an NTSC signal comprises Y, I, and Q. The complex chroma component (I/Q) is modulated on a 3.579545 (specified to be exactly 315/88) MHz subcarrier. This subcarrier is maintained by transmitting, for each scan line, a sinusoidal reference signal known as colorburst located before the active line of video.

A video decoder may remove the luma component and demodulates the subcarrier to produce the chroma component comprising the I/Q pair. However, the video decoder may not separate the entire luma component from the chroma component. When a portion of the luma component remains in the chroma component, this is called cross-chroma interference. The cross-chroma interference may cause detrimental visual artifacts. For example if a picture contains a diagonal edge with substantial luma contrast, the video may appear to have fast moving twinkling color detail that is not actually part of the desired video content.

Noise filters and other processors may compare the luma and the chroma differences between two pictures to, for example, estimate motion and/or noise. The cross-chroma information may be large enough that it makes accurate estimation difficult. For example, a static picture may appear to have some characteristics of a moving picture.

A video signal may comprise a vertical frequency (FV) of 59.94 Hz and a horizontal frequency (FH) of 4.5 MHz/286=15734.26 Hz. A Color Subcarrier Frequency (FSC) is the 455th harmonic of half the horizontal frequency 455×FH/2=3.579545 MHz. This choice of numbers means that similar color information at one point in successive frames will be out of phase. Therefore, the average of two consecutive frames can create a null at a frequency containing cross-chroma interference. The scan lines in the luminance spectrum occur at nFH while those of the color spectrum occur at (n+½)FH resulting in interleaving of the two spectra.

Figure 1:
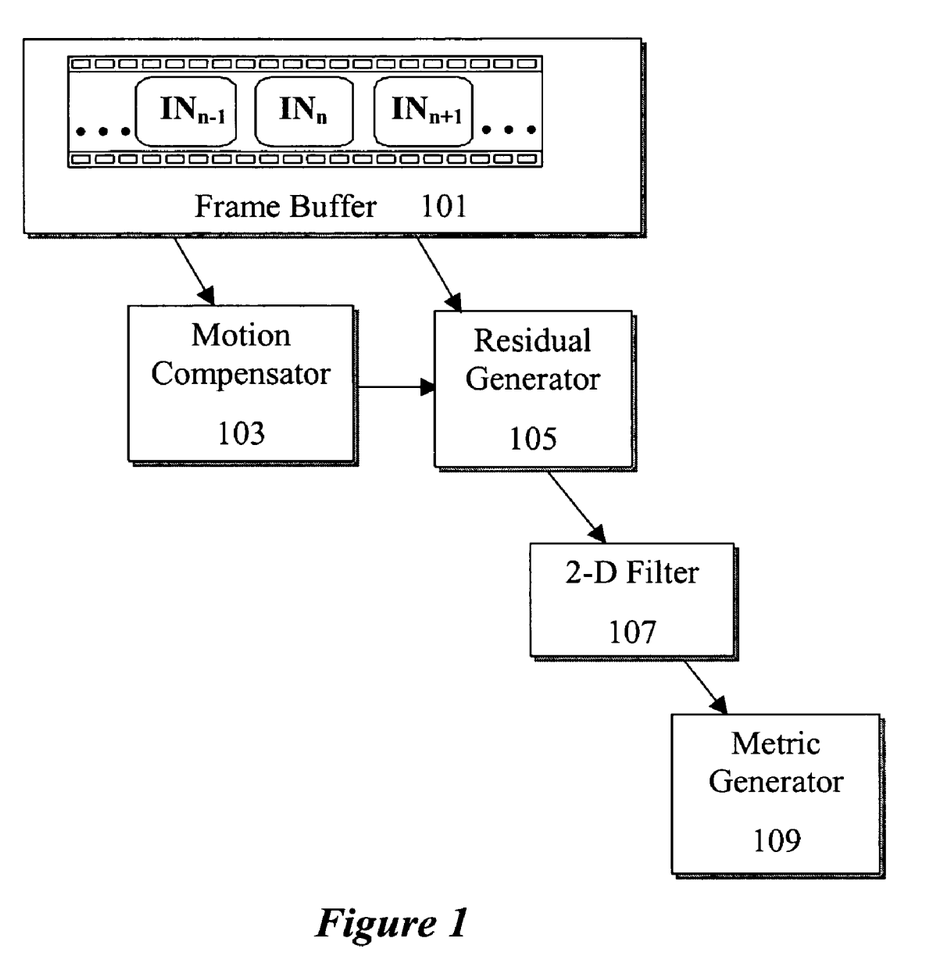
FIG. 1 is a block diagram of an exemplary system for video evaluation in the presence of cross-chroma interference in accordance with an embodiment of the present invention.

FIG. 1 is a block diagram of an exemplary system for video evaluation in the presence of cross-chroma interference in accordance with an embodiment of the present invention. The exemplary system comprises a frame buffer 101, a motion compensator 103, a residual generator 105, a 2-dimensional filter 107, and a metric generator 109.

Motion between a current picture and a reference picture is estimated and compensated for in the motion compensator 103.

The residual generator 105 generates a residual value based on the current picture and the motion compensated picture.

The two-dimensional filter 107 accumulates and filters the chroma component (chrominance) of the residual value. The selection of taps for the two-dimensional filter 107 is described further in reference to FIG. 2 and FIG. 3.

The metric generator 109 generates a metric associated with the reference video block based on the output of the two-dimensional filter 107.

The metrics utilized in certain embodiments of the present invention can be combined by the system(s), method(s), or apparatus described in METHOD AND SYSTEM FOR MOTION COMPENSATION, Ser. No. 60/701,181, filed Jul. 18, 2005 by MacInnis, and incorporated herein by reference for all purposes.

Figure 2:
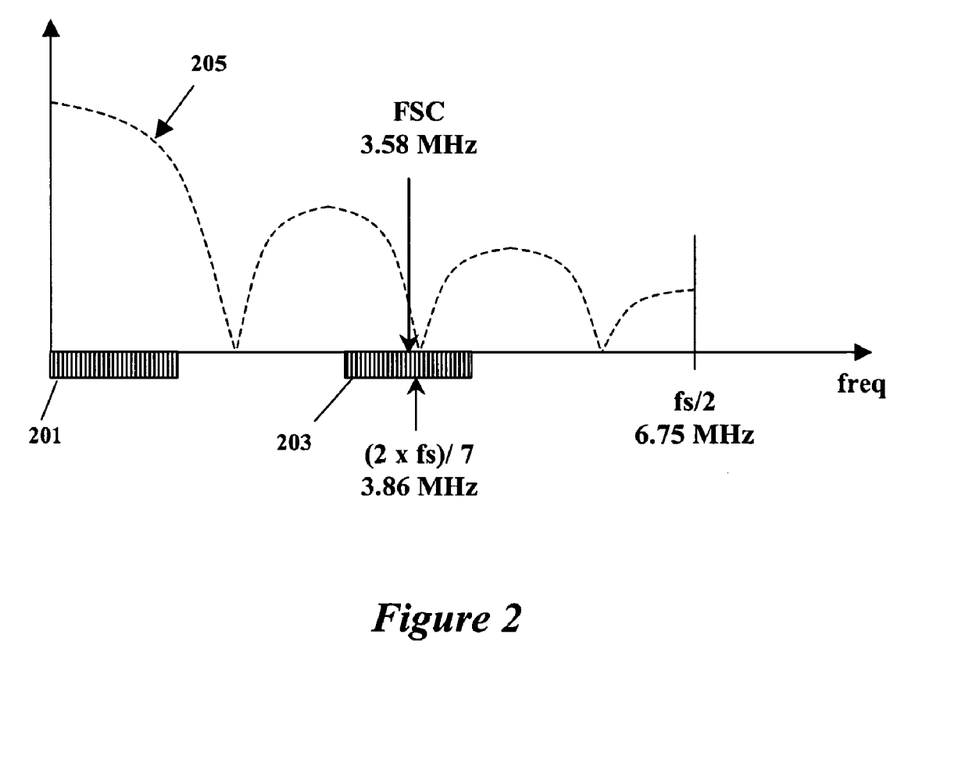
FIG. 2 is a graph describing horizontal filtering in accordance with an embodiment of the present invention.

FIG. 2 is a graph describing horizontal filtering in accordance with an embodiment of the present invention. After demodulation by FSC, the chroma component 201 is at baseband and the luma component 203 that may cause cross-luma is centered at FSC.

An FIR filter with equal tap weights can be utilized to produce a null close to FSC to reduce spurious luma that may still be present. The attenuation possible with an N-tap FIR with equal taps can be given by:

$$20 \log_{10}[|\sin c(N\pi(FSC\pm\delta)/fs)|] \text{ dB}$$

Where δ MHz is the single sided bandwidth of the cross-chroma interference. The δ may be dependent on motion in the video sequence.

Chroma information does not extend above half the sub carrier frequency, but decreasing the filter bandwidth by lengthening the FIR substantially may not be desirable since processing would increase and the correspondence between the FIR output and a small block size would decrease. The period of FSC is approximately 3.77 cycles of a 13.5 MHz sample clock. A 7-tap FIR 205 would produce a second null near FSC. Likewise if the analog video signal is sampled at 27 MHz, 7-tap FIR filter (27 MHz/3.58 MHz=7.5 taps) or a 15-tap FIR filter (27 MHz/3.58 MHz=15 taps/2) may be used.

Figure 3:
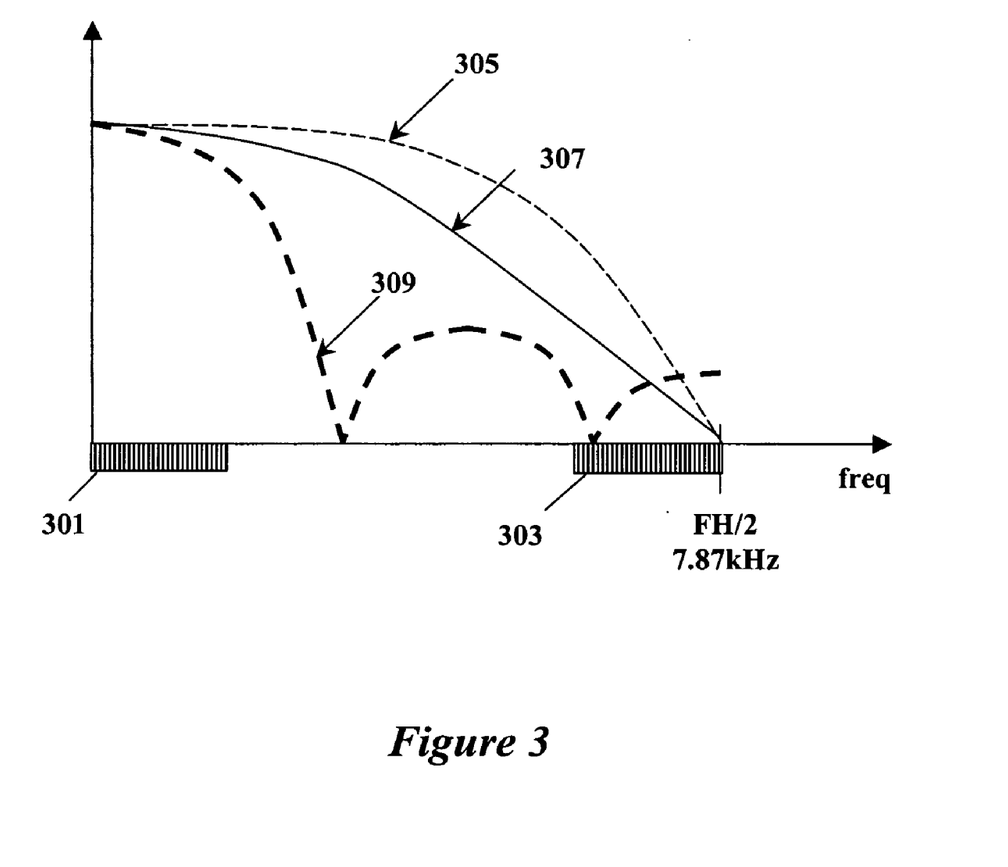
FIG. 3 is a graph describing vertical filtering in accordance with an embodiment of the present invention.

FIG. 3 is a graph describing vertical filtering in accordance with an embodiment of the present invention. After demodulation by FSC, the chroma component 301 is interlaced with the luma component 303. The chroma component 301 will appear at DC and at multiples of the horizontal frequency, nFH. The luma component 303 will be centered at (n+½)FH. An FIR filter with equal tap weights can be utilized to produce a null close at FH/2 to reduce luma that may still be present.

Vertical tap selection may include [1,1] filtering 305, [1,2,1] filtering 307, or [1,1,1,1,1] filtering 309.

A Motion Compensated Temporal Filter (MCTF) can apply motion compensation prior to filtering in the time domain. Removing cross-chroma interference from a decision metric can allow the MCTF control to apply filtering during conditions that may have otherwise been classified as having significant content motion or has having too much noise to distinguish reliably from content motion.

Motion Compensated Temporal Filters can be generated by the system(s), method(s), or apparatus described in METHOD AND SYSTEM FOR NOISE REDUCTION WITH A MOTION COMPENSATED TEMPORAL FILTER, Ser. No. 60/701,179, filed Jul. 18, 2005 by MacInnis, and incorporated herein by reference for all purposes.

Figure 4:
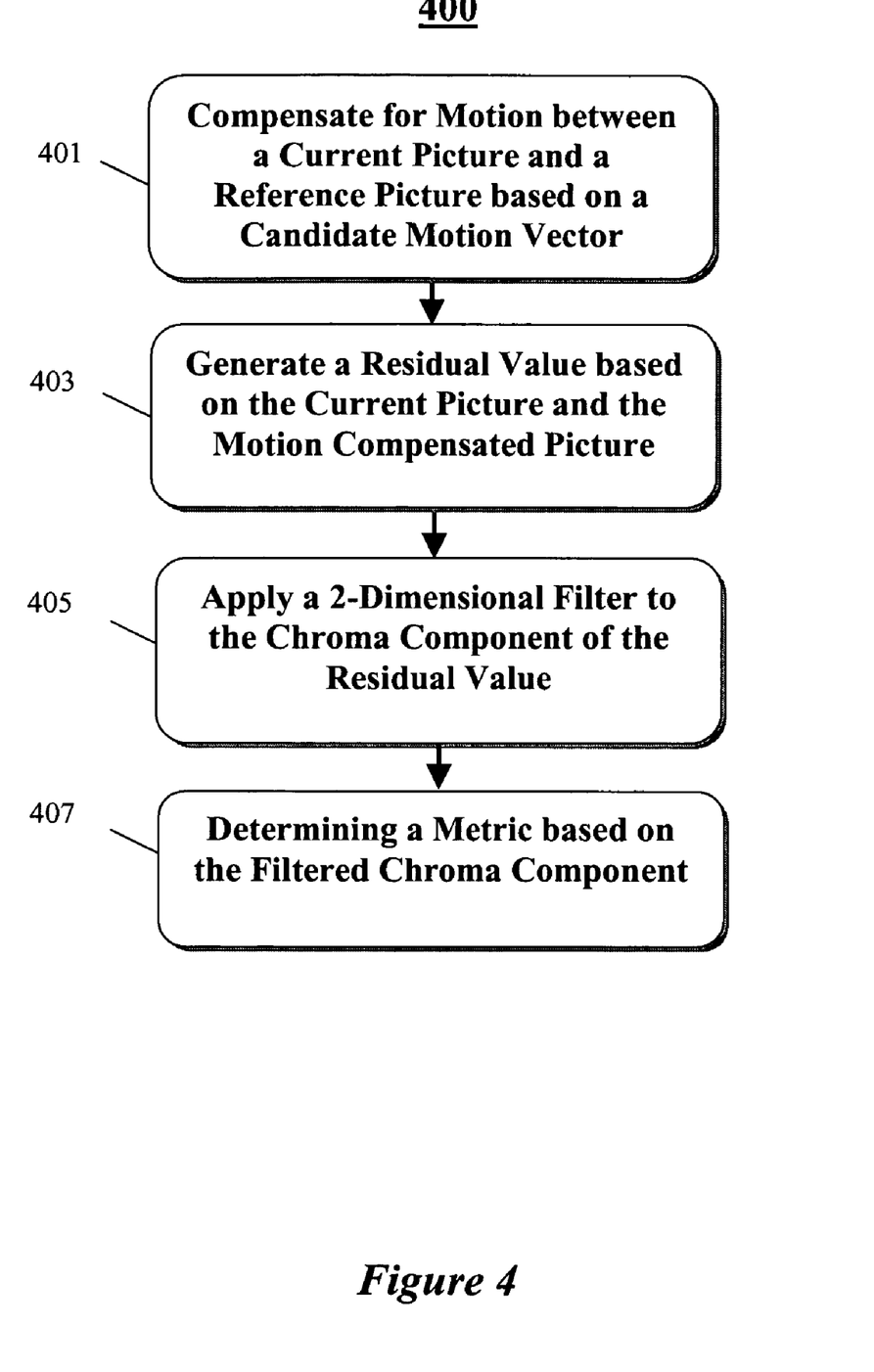
FIG. 4 is a flow diagram of an exemplary method for video evaluation in the presence of cross-chroma interference in accordance with an embodiment of the present invention.

FIG. 4 is a flow diagram 400 of an exemplary method for video sequence evaluation in the presence of cross-chroma interference.

At 401, motion between a current picture and a reference picture may be estimated and compensated for in a motion compensator. The reference video block may come from a picture in a video sequence that is before or after the picture containing the current video block. Additionally, the following method may be applied without motion compensation; for example, a non-motion-compensated temporal filter.

At 403, a residual value is generated based on the current picture and the motion compensated picture.

At 405, a 2-dimensional filter is applied to the chroma component of the residual value. This filtering may be applied to each candidate motion vector that is being considered, thereby incorporating the cross-chroma filtering into the motion estimation. The size of the 2-dimensional filter may comprise any dimension. For example, the vertical dimension may be 2, 3, or 5 pixels, and the horizontal dimension may be 7 pixels. The pixels may each be weighted equally or unequally. For example in the case of 3 pixels in the vertical dimension, the center row may be weighted twice as much as the top and bottom rows.

At 407, the filtered chroma is evaluated, forming a metric based on the filtered chroma residual. This estimate may indicate the presence of content information in the residual. The metric may also reflect an evaluation of the luma residual. The metric can be attributed to the reference video block. The metric may also provide the basis for adapting parameters of a filter that provides noise reduction by filtering the current video block and the reference video bloc. The adaptive filter may use motion compensation; alternatively it may not use motion compensation. The adaptation of the filter may be based in part on the scaling of various signals.

Figure 5:
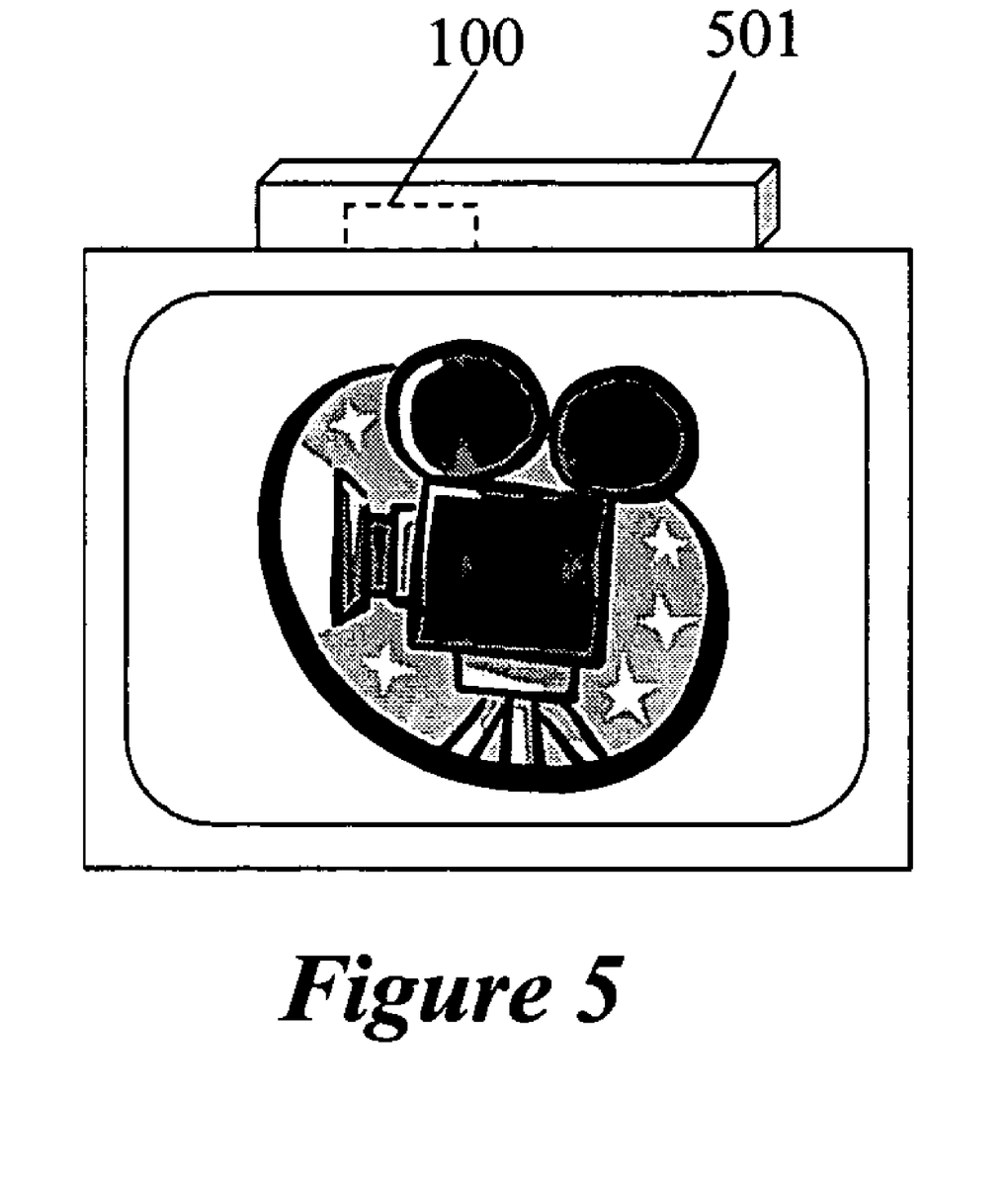
FIG. 5 is a picture of an exemplary video display device in accordance with an embodiment of the present invention.

FIG. 5 is a picture of an exemplary video display device 501 containing a system for video evaluation in the presence of cross-chroma interference 101 in accordance with an embodiment of the present invention. This video display device may be a set top box that receives noisy analog video. The system for video evaluation in the presence of cross-chroma interference 101 may classify noise prior to the display or further processing of the communicated video data.

The embodiments described herein may be implemented as a board level product, as a single chip, application specific integrated circuit (ASIC), or with varying levels of a video processing circuit integrated with other portions of the system as separate components. An integrated circuit may store video data in memory and use an arithmetic logic circuit to perform video processing.

The degree of integration of the video processing circuit will primarily be determined by the speed and cost considerations. Because of the sophisticated nature of modern processors, it is possible to utilize a commercially available processor, which may be implemented external to an ASIC implementation.

If the processor is available as an ASIC core or logic block, then the commercially available processor can be implemented as part of an ASIC device wherein certain functions can be implemented in firmware as instructions stored in a memory. Alternatively, the functions can be implemented as hardware accelerator units controlled by the processor.

While the present invention has been described with reference to certain embodiments, it will be understood by those skilled in the art that various changes may be made and equivalents may be substituted without departing from the scope of the present invention.

Additionally, many modifications may be made to adapt a particular situation or material to the teachings of the present invention without departing from its scope. For example, the invention can be applied to video data associated with a wide variety of analog and/or digital standards in addition to NTSC.

Therefore, it is intended that the present invention not be limited to the particular embodiment disclosed, but that the present invention will include all embodiments falling within the scope of the appended claims.

The invention claimed is:

1. A method for video evaluation in the presence of cross-chroma interference, said method comprising:
   generating a predicted picture based on a reference picture with a circuit;
   generating a residual value based on a plurality of chroma components in the predicted picture and the current picture;
   filtering the residual value; and
   attributing a metric to one of either the reference picture or the predicted picture based on the filtered residual value;
   providing the predicted picture for display;
   scaling the predicted picture according to the metric; and
   combining the current picture with the scaled predicted picture.

2. The method of claim 1, wherein the predicted picture is a motion predicted picture.

3. The method of claim 1, wherein the picture to which the metric is attributed is the reference picture.

4. The method of claim 1, wherein the picture to which the metric is attributed is the current picture.

5. The method of claim 1, wherein the predicted picture is a motion compensated block, associated with a motion vector.

6. The method of claim 5, wherein the method further comprises:
   selecting the motion vector from a plurality of candidate motion vectors based on the metric.

7. The method of claim 5, wherein an input video sequence comprises a previous video block followed by the current video picture, and wherein applying the motion vector to the previous video block generates the motion compensated block.

8. The method of claim 5, wherein an input video sequence comprises the current video block followed by a future video block, and wherein applying the motion vector to the future video block generates the motion compensated block.

9. The method of claim 1, wherein filtering is 2-dimensional.

10. The method of claim 9, wherein filtering in the vertical dimension spans two pixels.

11. The method of claim 9, wherein filtering in the vertical dimension spans three adjacent pixels, and wherein a center pixel is scaled by twice as much as a top pixel and a bottom pixel.

12. The method of claim 9, wherein filtering in the vertical dimension spans five pixels.

13. The method of claim 9, wherein filtering in the horizontal dimension spans a multiple of seven pixels.

14. A system for video evaluation in the presence of cross-chroma interference, said method comprising:
   a motion compensator for generating a prediction block;
   a residual generator for generating a residual block based on the prediction block and a current block;
   a 2-dimensional filter for filtering the residual block; and
   a metric generator for generating a metric associated with one of either the prediction block and the residual block based on the output from the 2-dimensional filter; and
   wherein the vertical dimension of the two-dimensional filters comprises three filter taps, and wherein a center tap has twice the weight as a top tap and a bottom tap.

15. The system of claim 14, wherein the video block with which the metric is associated is the prediction block.

16. The system of claim 14, wherein the video block with which the metric is associated is the current block.

17. The system of claim 14, wherein the residual block comprises chroma differences between the residual block and the prediction block.

18. The system of claim 14, wherein the vertical dimension of the two-dimensional filter comprises two filter taps of equal weight.

19. The system of claim 14, wherein the vertical dimension of the two-dimensional filters comprises five filter taps of equal weight.

20. The system of claim 14, wherein the horizontal dimension of the two-dimensional filters comprises seven filter taps of equal weight.

21. A method for video evaluation in the presence of cross-chroma interference, said method comprising:
generating a predicted picture based on a reference picture with a circuit;
generating a residual value based on a plurality of chroma components in the predicted picture and the current picture;
filtering the residual value;
attributing a metric to one of either the reference picture or the predicted picture based on the filtered residual value;
providing the predicted picture for display;
wherein the predicted picture is a motion compensated block, associated with a motion vector, selecting the motion vector from a plurality of candidate motion vectors based on the metric.

22. The method of claim 21, wherein the predicted picture is a motion predicted picture.

23. The method of claim 21, wherein the picture to which the metric is attributed is the reference picture.

24. The method of claim 21, wherein the picture to which the metric is attributed is the current picture.

25. The method of claim 21, wherein an input video sequence comprises a previous video block followed by the current video picture, and wherein applying the motion vector to the previous video block generates the motion compensated block.

26. The method of claim 21, wherein an input video sequence comprises the current video block followed by a future video block, and wherein applying the motion vector to the future video block generates the motion compensated block.

27. The method of claim 21, wherein filtering is 2-dimensional.

28. The method of claim 27, wherein filtering in the vertical dimension spans two pixels.

29. The method of claim 27, wherein filtering in the vertical dimension spans three adjacent pixels, and wherein a center pixel is scaled by twice as much as a top pixel and a bottom pixel.

30. The method of claim 27, wherein filtering in the vertical dimension spans five pixels.

31. The method of claim 27, wherein filtering in the horizontal dimension spans a multiple of seven pixels.

32. A method for video evaluation in the presence of cross-chroma interference, said method comprising:
generating a predicted picture based on a reference picture with a circuit;
generating a residual value based on a plurality of chroma components in the predicted picture and the current picture;
filtering the residual value;
attributing a metric to one of either the reference picture or the predicted picture based on the filtered residual value;
providing the predicted picture for display;
wherein the predicted picture is a motion compensated block; and
wherein an input video sequence comprises a previous video block followed by the current video picture, and wherein applying the motion vector to the previous video block generates the motion compensated block.

33. The method of claim 32, wherein the predicted picture is a motion predicted picture.

34. The method of claim 32, wherein the picture to which the metric is attributed is the reference picture.

35. The method of claim 32, wherein the picture to which the metric is attributed is the current picture.

36. The method of claim 32, wherein an input video sequence comprises the current video block followed by a future video block, and wherein applying the motion vector to the future video block generates the motion compensated block.

37. The method of claim 23, wherein filtering is 2-dimensional.

38. The method of claim 37, wherein filtering in the vertical dimension spans two pixels.

39. The method of claim 37, wherein filtering in the vertical dimension spans three adjacent pixels, and wherein a center pixel is scaled by twice as much as a top pixel and a bottom pixel.

40. The method of claim 37, wherein filtering in the vertical dimension spans five pixels.

41. The method of claim 37, wherein filtering in the horizontal dimension spans a multiple of seven pixels.

42. A method for video evaluation in the presence of cross-chroma interference, said method comprising:
generating a predicted picture based on a reference picture with a circuit;
generating a residual value based on a plurality of chroma components in the predicted picture and the current picture;
filtering the residual value;
attributing a metric to one of either the reference picture or the predicted picture based on the filtered residual value;
providing the predicted picture for display;
wherein filtering is 2-dimensional; and
wherein filtering in the vertical dimension spans two pixels.

43. The method of claim 42, wherein filtering in the vertical dimension spans three adjacent pixels, and wherein a center pixel is scaled by twice as much as a top pixel and a bottom pixel.

44. The method of claim 42, wherein filtering in the vertical dimension spans five pixels.

45. The method of claim 42, wherein filtering in the horizontal dimension spans a multiple of seven pixels.

46. A method for video evaluation in the presence of cross-chroma interference, said method comprising:
generating a predicted picture based on a reference picture with a circuit;
generating a residual value based on a plurality of chroma components in the predicted picture and the current picture;
filtering the residual value;
attributing a metric to one of either the reference picture or the predicted picture based on the filtered residual value;
providing the predicted picture for display;
wherein filtering is 2-dimensional; and wherein filtering in the vertical dimension spans three adjacent pixels, and wherein a center pixel is scaled by twice as much as a top pixel and a bottom pixel.

47. The method of claim 46, wherein filtering in the vertical dimension spans five pixels.

48. The method of claim 46, wherein filtering in the horizontal dimension spans a multiple of seven pixels.

49. A method for video evaluation in the presence of cross-chroma interference, said method comprising:
  generating a predicted picture based on a reference picture with a circuit;
  generating a residual value based on a plurality of chroma components in the predicted picture and the current picture;
  filtering the residual value;
  attributing a metric to one of either the reference picture or the predicted picture based on the filtered residual value;
  providing the predicted picture for display;
  wherein filtering is 2-dimensional; and
  wherein filtering in the vertical dimension spans five pixels.

50. The method of claim 49, wherein filtering in the horizontal dimension spans a multiple of seven pixels.

51. A method for video evaluation in the presence of cross-chroma interference, said method comprising:
  generating a predicted picture based on a reference picture with a circuit;
  generating a residual value based on a plurality of chroma components in the predicted picture and the current picture;
  filtering the residual value;
  attributing a metric to one of either the reference picture or the predicted picture based on the filtered residual value;
  providing the predicted picture for display;
  wherein filtering is 2-dimensional; and
  wherein filtering in the horizontal dimension spans a multiple of seven pixels.

52. A system for video evaluation in the presence of cross-chroma interference, said method comprising:
  a motion compensator for generating a prediction block;
  a residual generator for generating a residual block based on the prediction block and a current block;
  a 2-dimensional filter for filtering the residual block; and
  a metric generator for generating a metric associated with one of either the prediction block and the residual block based on the output from the 2-dimensional filter; and
  wherein the vertical dimension of the two-dimensional filter comprises five filter taps of equal weight.

53. The system of claim 52, wherein the video block with which the metric is associated is the prediction block.

54. The system of claim 52, wherein the video block with which the metric is associated is the current block.

55. The system of claim 52, wherein the residual block comprises chroma differences between the residual block and the prediction block.

56. The system of claim 52, wherein the horizontal dimension of the two-dimensional filters comprises seven filter taps of equal weight.

* * * * *